US010503178B2

(12) United States Patent
Ding

(10) Patent No.: US 10,503,178 B2
(45) Date of Patent: Dec. 10, 2019

(54) SYSTEM FOR AND METHOD OF MONITORING FLOW THROUGH MASS FLOW CONTROLLERS IN REAL TIME

(71) Applicant: MKS Instruments, Inc., Andover, MA (US)

(72) Inventor: Junhua Ding, Boxborough, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 15/419,047

(22) Filed: Jan. 30, 2017

(65) Prior Publication Data

US 2017/0199529 A1 Jul. 13, 2017

Related U.S. Application Data

(63) Continuation of application No. 14/205,030, filed on Mar. 11, 2014, now Pat. No. 9,557,744, which is a (Continued)

(51) Int. Cl.
*G05D 7/06* (2006.01)
*G01F 25/00* (2006.01)
(Continued)

(52) U.S. Cl.
CPC ............. *G05D 7/0635* (2013.01); *G01F 1/88* (2013.01); *G01F 15/002* (2013.01); (Continued)

(58) Field of Classification Search
CPC ........................................................ G01F 1/88
See application file for complete search history.

(56) References Cited

U.S. PATENT DOCUMENTS 3,083,570 A * 4/1963 Truman ................ G01F 25/003
235/103.5 R
3,952,759 A 4/1976 Ottenstein
(Continued)

FOREIGN PATENT DOCUMENTS

CN 1360201 A 7/2002
CN 1513110 7/2004
(Continued)

OTHER PUBLICATIONS

Brooks Instrument, Installation and Operation Manual, X-TMF-GF100-Series-MFC-eng. Part No. 541B137AAG, 82 pages (2013).
(Continued)

*Primary Examiner* — Reinaldo Sanchez-Medina
*Assistant Examiner* — Nicole Gardner
(74) *Attorney, Agent, or Firm* — Hamilton, Brook, Smith & Reynolds, P.C.

(57) ABSTRACT

A mass flow controller comprises: a first flow meter constructed and arranged to measured flow rate of mass through the mass flow controller; a second flow meter constructed and arranged to measure flow rate of mass through the mass flow controller; a control valve constructed and arranged so as to control the flow rate of mass through the mass flow controller in response to a control signal generated as a function of the flow rate as measured by one of the flow meters; and a system controller constructed and arranged to generate the control signal, and to provide an indication when a difference between the flow rate of mass as measured by the first flow meter and the flow rate of mass as measured by the second flow meter exceeds a threshold.

9 Claims, 4 Drawing Sheets

Related U.S. Application Data continuation-in-part of application No. 13/354,988, filed on Jan. 20, 2012, now Pat. No. 98,460,748.

(51) Int. Cl.
  *G01F 15/00* (2006.01)
  *G01F 1/88* (2006.01)

(52) U.S. Cl.
  CPC .......... *G01F 15/005* (2013.01); *G01F 25/003* (2013.01); *G01F 25/0053* (2013.01); *Y10T 137/776* (2015.04)

(56) References Cited

U.S. PATENT DOCUMENTS

| | | | |
|---|---|---|---|
| 4,341,107 A * | 7/1982 | Blair | C23C 16/52 |
| | | | 137/101.19 |
| 4,487,213 A | 12/1984 | Gates et al. | |
| 5,816,285 A * | 10/1998 | Ohmi | G05D 7/0635 |
| | | | 137/487.5 |
| 6,394,120 B1 | 5/2002 | Wichert | |
| 6,439,253 B1 | 8/2002 | Easton | |
| 6,945,123 B1 | 9/2005 | Kuehl et al. | |
| 7,204,158 B2 | 4/2007 | Morgan et al. | |
| 7,636,640 B2 | 12/2009 | Wang et al. | |
| 7,654,151 B2 | 2/2010 | Agar et al. | |
| 7,658,204 B2 | 2/2010 | Ishida | |
| 7,823,436 B2 | 11/2010 | Monkowski et al. | |
| 7,826,986 B2 | 11/2010 | McDonald | |
| 8,109,289 B2 | 2/2012 | Trnka et al. | |
| 8,240,324 B2 | 8/2012 | Monkowski et al. | |
| 8,265,888 B2 | 9/2012 | Chung et al. | |
| 8,271,210 B2 | 9/2012 | Chung et al. | |
| 8,271,211 B2 | 9/2012 | Chung et al. | |
| 8,356,623 B2 | 1/2013 | Isobe et al. | |
| 8,504,318 B2 | 8/2013 | Mendelson et al. | |
| 8,751,180 B2 | 1/2014 | Lull et al. | |
| 2002/0083984 A1 | 7/2002 | Easton | |
| 2003/0039550 A1 | 2/2003 | Wichert | |
| 2003/0236592 A1 | 12/2003 | Shajii et al. | |
| 2006/0278276 A1 | 12/2006 | Tanaka et al. | |
| 2006/0283254 A1 | 12/2006 | Ding et al. | |
| 2007/0113641 A1 | 5/2007 | Ding et al. | |
| 2009/0112504 A1 | 4/2009 | Ding et al. | |
| 2009/0183548 A1 | 7/2009 | Monkowski et al. | |
| 2009/0183549 A1 | 7/2009 | Monkowski et al. | |
| 2009/0212847 A1 | 8/2009 | Schultz et al. | |
| 2009/0266139 A1 | 10/2009 | Gregor et al. | |
| 2010/0080262 A1 | 4/2010 | McDonald | |
| 2010/0125424 A1 | 5/2010 | Ding et al. | |
| 2010/0209859 A1 | 8/2010 | Inoue et al. | |
| 2011/0022334 A1 | 1/2011 | Ding et al. | |
| 2011/0108126 A1 | 5/2011 | Monkowski et al. | |
| 2011/0139271 A1 | 6/2011 | Hirata et al. | |
| 2011/0284500 A1 | 11/2011 | Rappl et al. | |
| 2012/0132291 A1 | 5/2012 | Monkowski et al. | |
| 2012/0216600 A1 * | 8/2012 | Heyne | G01F 15/005 |
| | | | 73/40.5 R |
| 2012/0216888 A1 | 8/2012 | Ding et al. | |
| 2012/0304781 A1 | 12/2012 | Monkowski et al. | |
| 2013/0186486 A1 | 7/2013 | Ding | |

FOREIGN PATENT DOCUMENTS

| | | |
|---|---|---|
| CN | 101208641 | 6/2008 |
| CN | 101238357 | 8/2008 |
| CN | 101796378 | 8/2010 |
| CN | 102057340 | 5/2011 |
| CN | 102124418 | 7/2011 |
| CN | 102235573 A | 11/2011 |
| DE | 102009046758.0 | 11/2009 |
| DE | 102009046758 | 5/2011 |
| JP | 54-158524 A | 12/1979 |
| JP | H3166611 | 7/1991 |
| JP | H3211601 | 9/1991 |
| JP | H08312908 | 11/1996 |
| JP | 09280913 A | 10/1997 |
| JP | 2004246826 | 9/2004 |
| JP | 2008-170410 A | 7/2008 |
| JP | 2011530755 | 12/2011 |
| JP | 2012237733 | 6/2012 |
| JP | 2013508825 A | 3/2013 |
| JP | 2003167630 | 6/2013 |
| TW | 1223056 | 11/2004 |
| WO | 2010018191 | 2/2010 |
| WO | 2011047361 | 4/2011 |
| WO | 2013109443 A1 | 7/2013 |
| WO | 2013134141 | 9/2013 |

OTHER PUBLICATIONS

Brooks Instrument, Data Sheet GF 135 Digital Mass Flow controller, 10 pages (2013).
International Search Report and the Written Opinion dated Feb. 11, 2014 from corresponding PCT Application No. PCT/US2013/057184.
Office Action dated Aug. 18, 2015 from Corresponding Japanese Application No. 2014-553321.
Non Final Office Action dated Jun. 29, 2015 from Corresponding U.S. Appl. No. 13/354,967.
International Search Report and the Written Opinion dated Mar. 11, 2013 for Corresponding PCT Application No. PCT/US2013/020790.
International Search Report and the Written Opinion from Corresponding PCT Application No. PCT/US2015/015831 dated May 22, 2015.
International Search Report and the Written Opinion from Corresponding PCT Application No. PCT/US2015/012851 dated Apr. 28, 2015.
Office Action dated Oct. 2, 2015 from Corresponding Taiwan Patent Application No. 104106156.
Office Action dated Sep. 23, 2015 from Corresponding Korean Patent Application No. 10-2014-7022413.
Extended European Search Report received in Application No. 15760895.1, dated Oct. 5, 2017; 16 pages.

* cited by examiner

SYSTEM FOR AND METHOD OF MONITORING FLOW THROUGH MASS FLOW CONTROLLERS IN REAL TIME

CROSS-REFERENCE TO RELATED APPLICATIONS

This application is a divisional of U.S. application Ser. No. 14/205,030 filed Mar. 11, 2014, which is a continuation-in-part of U.S. patent application Ser. No. 13/354,988 filed Jan. 20, 2012, both of which applications are incorporated by reference herein in their entirety.

BACKGROUND

Field

This disclosure relates generally to mass flow controllers (MFCs), and more particularly to a system for and method of monitoring flow through MFCs in real time. As used herein the term "gas" includes the term "vapor(s)" should the two terms be considered different.

Overview

Mass flow controllers (MFCs) are devices for measuring and controlling the flow of gases. They are usually used to control the flow of gases during a semiconductor manufacturing process wherein the flow of gases into a semiconductor tool, such as a vacuum chamber, must be carefully controlled in order to produce high yield semiconductor products. MFCs are usually designed and calibrated to control specific types of gas at particular ranges of flow rates. The devices control the rate of flow based on a given setpoint, usually predetermined by the user or an external device such as the semiconductor tool itself. MFCs can be either analog or digital. They are typically designed to be used with pressure ranges of the inlet gases, with low pressure and high pressure MFCs being available. All MFCs have an inlet port, and outlet ports, a mass flow meter including a mass flow sensor and a proportional control valve. A system controller is used as a part of a feedback control system that provides a control signal to the control valve as a function of a comparison of the flow rate as determined by the setpoint with the measured flow rate as sensed by the mass flow sensor. The feedback control system thus operates the valve so that the measured flow is maintained at the flow rate as determined by the setpoint.

Such control systems assume that the MFC remains in calibration within certain tolerances. In order test whether an MFC is within the tolerances of calibration, the MFC is typically tested off line with such devices as mass flow verifiers. The latter are used to test the flow rates. While off line testing is very accurate, there is always a problem that a MFC can become out of calibration during the running of a process (in real time), and not be detected until the process is completed. Often this can result in lower yields of semiconductor product, and even a complete failure resulting in the loss of the entire product yield. This can be expensive, and is clearly undesirable. What is needed is a device and method for continually testing the calibration settings of a MFC in real time while processes are being run.

DESCRIPTION OF RELATED ART

Reference is made to Japanese Published Application 2004-246826A2004.9.2 and U.S. Pub. App. No. 2006/0278276.

SUMMARY

In accordance with one embodiment, a mass flow controller is provided for controlling the flow of gas from a source to a target. The mass flow controller comprises: first and second flow meters, and upstream and downstream proportional control valves. The first flow meter is constructed and arranged to measure the flow rate of the mass of a gas through the mass flow controller as a function of thermal sensing mass flow. The second flow meter includes a pressure sensor and a structure defining a predefined volume for receiving gas flowing through the mass flow controller. The second flow meter is constructed and arranged to measure flow rate of the mass of the gas through the mass flow controller as a function of measured rate of decay of the gas pressure when allowed to flow from a predefined volume. The upstream proportional control valve is constructed and arranged to selectively control the rate of flow of gas into the mass flow controller. The downstream proportional control valve is constructed and arranged so as to control the flow rate of the mass of the gas from the mass flow controller in response to a control signal generated as a function of a set point and the flow rate as measured by one of the flow meters. A system processor/controller constructed and arranged to generate the control signal, and to provide an indication when a difference between the flow rate of mass the gas as measured by the first flow meter and the flow rate of the mass of the gas as measured by the second flow meter exceeds a threshold. The pressure sensor, upstream flow proportional control valve and system processor/controller are further constructed and arranged so as to form a closed-loop pressure controller configured to regulate the pressure inside the predefined volume.

In one embodiment the closed-loop pressure controller is further constructed and arranged so that the upstream proportional control valve can be adjusted so as to let the inside pressure of the predefined volume rise to the upstream pressure of inlet gas sufficiently slow so as to avoid in-rush gas.

In one embodiment the closed-loop pressure controller is further constructed and arranged so that if there is an upstream pressure disturbance during flow control when the mass flow controller is controlling the flow of gas from a source to a target, the closed-loop pressure controller will automatically adjust the openness of the upstream proportional control valve so as to regulate the pressure within the predetermined volume such that the inlet pressure disturbance effect on the output flow control of the mass flow controller is minimized and the pressure insensitivity performance of the flow control of mass flow controller is improved.

In one embodiment the closed-loop pressure controller is constructed and arranged so that if there is an upstream pressure disturbance during flow control when the mass flow controller is controlling the flow of gas from a source to a target, the closed-loop pressure controller will automatically adjust the openness of the upstream proportional control valve so as to regulate the pressure within the predetermined volume such that the inlet pressure disturbance effect on the output flow control of the mass flow controller is minimized and the pressure insensitivity performance of the flow control of mass flow controller is improved.

In one embodiment the structure defining the predefined volume supports one or more of the first flow meter, the second flow meter, the upstream proportional control valve and the downstream proportional control valve.

In one embodiment the first mass flow meter comprises a thermal mass flow meter, and the downstream proportional control valve is positioned downstream from the thermal mass flow meter.

In one embodiment the second proportional control valve is positioned upstream from the first proportional control valve, the predefined volume is positioned between the first proportional control valve and the second proportional control valve through which gas can flow; and the mass flow controller further includes a pressure sensor and temperature sensor for respectively generating a pressure signal and a temperature signal representing the temperature and pressure of gas in the predefined volume.

In one embodiment the second flow meter includes a pressure sensor, and the system processor/controller, the pressure sensor and the second control valve form a closed-loop pressure controller to regulate the pressure inside the predefined volume.

In one embodiment the predefined volume is within the mass flow controller between the first and second control valve, and the closed-loop pressure controller is constructed and arranged so that (1) the second control valve can be controlled so as to slowly let the inside pressure of the MFC rise to the upstream pressure of the inlet gas in order to avoid in-rush gas; and (2) if there is an upstream pressure disturbance during the flow control period, the closed-loop pressure controller will automatically adjust the openness of the second control valve so as to regulate the pressure within the predetermined volume such that the inlet pressure disturbance effect on the output flow control of the mass flow controller is minimized, so as to improve the pressure insensitivity performance of the flow control of mass flow controller.

In one embodiment the mass flow controller and the processor/controller are configured and arranged to operate as follows:
  (a) when the set point at zero the flow control valve is closed, and the second control valve upstream from the flow control valve is opened to allow the gas from the source to fill the predefined volume. Then the second control valve is closed;
  (b) when a flow set point is changed from zero to a non-zero value, the second control valve is kept close and the flow control valve is opened to regulate the flow Qt measured by the first flow meter to the flow set point;
  (c) for a predetermined period of time, the mass flow controller verifies the flow rate based on the rate of decay of the pressure signal in accordance with the following relationship:

$$Qv = -V[d(P/T)]/dt$$

wherein QV is the verified flow rate as determined by the second flow meter;
  V is the predetermined volume;
  P is the pressure as measured by the pressure signal;
  T is the temperature as measured by the temperature signal; and
  $d(P/T)/dt$ is the first derivative of the ratio P/T; i.e., the rate of change of the ratio P/T. and
  (d) After the flow verification, the second control valve is opened to let mass flow controller continue the flow control.

In one embodiment the predetermined period of time is between about 50 ms and 1000 ms.

In one embodiment the mass flow controller is further configured to compare the verified flow rate Qv, with the flow rate measured by the first flow meter Qt, and wherein a flow error alarm signal is provided if the deviation between Qt and Qv exceeds the threshold.

In one embodiment the mass flow controller is configured to perform self-calibration based on the measured values of Qv and Qt.

In one embodiment the first proportional control valve is controlled allowing gas to flow through the mass flow controller as a function of the flow set point flow rate of mass through the mass flow controller so long as the flow set point is non-zero.

In one embodiment following the setting of the flow set point to zero, the mass flow controller is configured to immediately close the second proportional flow control valve.

In one embodiment the threshold is user set.

In one embodiment the threshold is factory set.

In one embodiment the threshold is set as a function of permissible tolerance in mass flow for the process with which the controller is used to deliver gas.

In accordance with one embodiment, a pressure insensitive mass flow controller is constructed and arrange to control the flow of gas from a source to a target. The mass flow controller comprises a first flow meter, a first proportional control valve, a system processor/controller, a second flow meter, a second, and an upstream proportional control valve. The first flow meter is constructed and arranged to provide a mass flow signal as a function of a set point and the measured flow of gas through the mass flow controller. The first proportional control valve is constructed and arranged to control the flow of gas through the mass flow controller in response to a valve control signal. The system processor/controller constructed and arranged to generate the valve control signal as a function of a set point signal and mass flow signal. The second flow meter includes a pressure sensor constructed and arranged to provide a pressure measurement signal representing the measured pressure of the gas flowing through the mass flow controller. The second flow meter is constructed and arranged to provide a second mass flow signal as a function of the measured pressure of the gas. The second, upstream proportional control valve is constructed and arranged upstream from the pressure sensor to selectively control the rate of flow of gas into the mass flow controller as a function of the second mass flow signal. The pressure sensor, second upstream flow proportional control valve and system processor/controller are further constructed and arranged so as to form a closed-loop pressure controller configured to regulate the pressure flow into the mass flow controller.

In accordance with another embodiment, a mass flow controller is constructed and arranged to control the flow rate of gas from a source to a target. The mass flow controller comprises: a first flow meter, a second flow meter, an upstream proportional control valve, a downstream proportional control valve, and a system processor/controller. The first flow meter is constructed and arranged to measure the flow rate of the mass of a gas through the mass flow controller as a function of sensing mass flow. The second flow meter includes a pressure sensor and a structure defining a predefined volume for receiving gas flowing through the mass flow controller. The second flow meter is constructed and arranged to measure and verify the flow rate of the mass of the gas through the mass flow controller as a function of measured pressure rate of decay of the gas when allowed to flow from the predefined volume. The upstream proportional control valve constructed and arranged to selectively control the flow rate of gas into the mass flow controller. The downstream proportional control valve is constructed and arranged so as to control the flow rate of the mass of the gas from the mass flow controller in response to a control signal generated as a function of a set point and the flow rate as measured by the first flow meter. The system processor/controller is constructed and arranged to generate the control signal and verify the accuracy of the mass flow control of the mass flow controller as a function of the measured pressure rate of decay of the gas allowed to flow from the predetermined volume. The structure defining the predefined volume is a mounting block for supporting at least the second flow meter and the upstream proportional control valve.

These, as well as other components, steps, features, objects, benefits, and advantages, will now become clear from a review of the following detailed description of illustrative embodiments and the accompanying drawings.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 1:
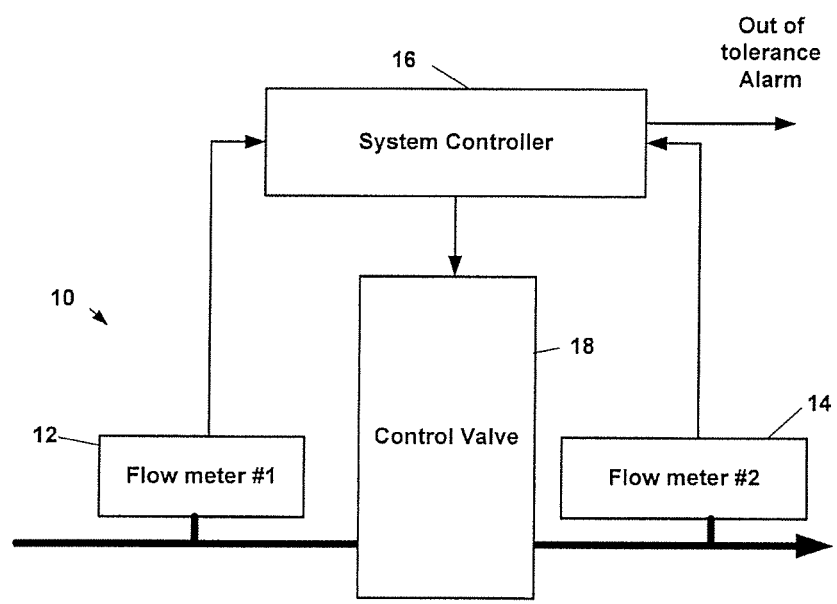
FIG. 1 is a simplified block diagram of a MFC constructed and arranged to control flow through the MFC and monitor the accuracy of the MFC in real time.

Referring to FIG. 1, the illustrated, exemplary mass flow controller 10 is constructed and arranged to control flow through the MFC and monitor the accuracy of the MFC in real time. As shown the controller 10 includes two flow meters 12 and 14, each independently generating a signal representing the measured rate of flow of gas through the MFC. The outputs of the two flow meters are provided to the system controller 16. The controller 16 processes the two signals received from the two flow meters 12 and 14 and provides a control signal to the proportional control valve 18 based on the flow measured by one of the flow meters and a set point, and an indication ("alarm") signal when a determination is made that the difference in the flow rates as measured by the two meters exceeds a predetermined threshold.

Figure 2:
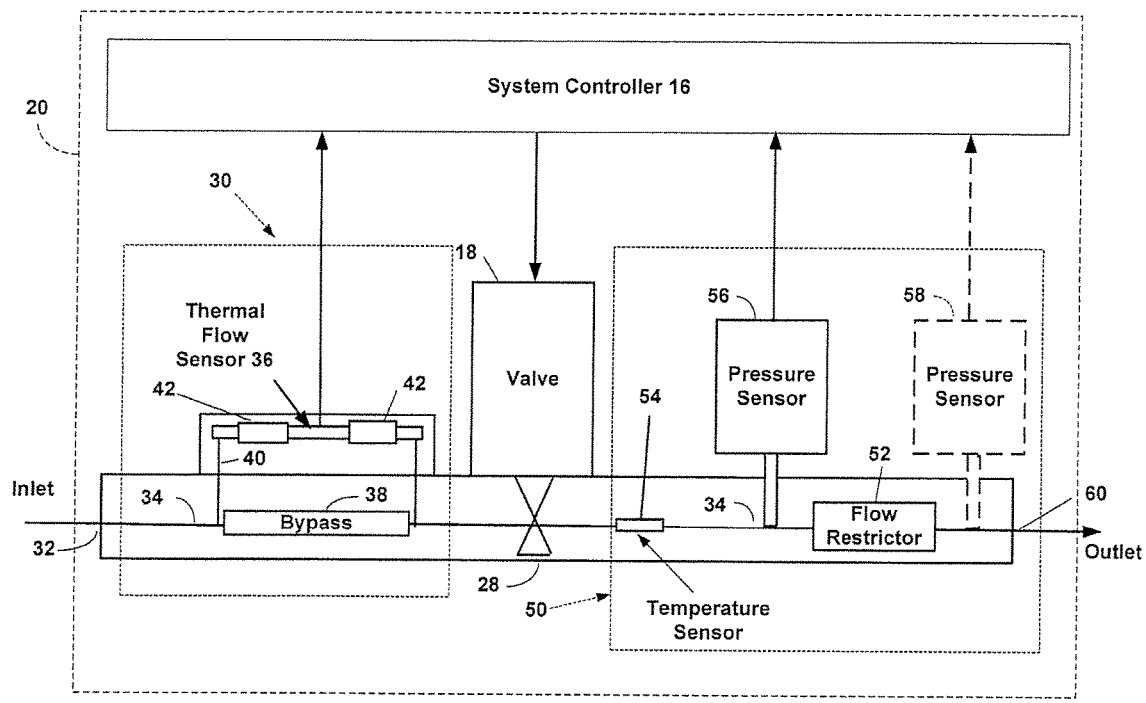
FIG. 2 is a block diagram of an embodiment of a MFC employing the teachings described here.

A more detailed exemplary embodiment of a MFC, indicated generally at 20, is shown in FIG. 2. The MFC 20 is constructed and arranged so as to control flow through the MFC and monitor the accuracy of the MFC in real time. As shown gas is received at the input port 32 of block 28 including a conduit defining the main flow path 34 through the MFC to the outlet port 60. The first flow meter 30 is shown as a thermal mass flow meter. Thermal mass flow meters typically include a thermal mass flow sensor 36. The latter usually includes a bypass element 38 disposed in the bypass of the main flow path 34 of the gas flow through the block 28. A U-shaped capillary tube 40 has opposite ends respectively connected to the primary pathway at the upstream and downstream ends of the bypass element 38. One or more resistance elements 42 (two being the most common) are used to measure flow through the capillary tube based on temperature measurements as a function, in the example, of the difference in resistances of the two resistance elements, which in turn is a function of the difference in the sensed temperatures of the fluid, a measure of the mass flow rate. The bypass element 38 is designed to ensure that gas flow through the bypass element 38 between the two ends of the capillary tube 40 is laminar. By maintaining laminar flow, the measured flow rate of gas through the capillary tube will be an accurate percentage of the flow through the main flow path 34. Thus, the sensed flow rate through the capillary tube 40 will be an accurate measure of the flow rate though the MFC 20 and exiting outlet port 60. Data representing the sensed flow rate is communicated to the system controller 16.

The second flow meter 50 is shown as a differential pressure flow meter. For choked flow conditions, the flow meter 50 includes a flow restrictor 52 (for example, a critical flow nozzle or orifice), and a temperature sensor 54 and an upstream pressure sensor 56 arranged to measure the respective temperature and pressure of the gas flowing through the main flow path 34 upstream from the flow restrictor 52. Data representing the sensed temperature and pressure is transmitted to the system controller for use in determining mass flow through the second flow meter 50 as a function of these sensed measurements. For non-choked flow conditions, a second or downstream pressure sensor 58 is provided on the downstream side of the flow restrictor 52. Data representing the sensed temperature, upstream pressure and downstream pressure is transmitted to the system controller 16 for determining mass flow through the second meter 50 as a function of the sensed measurements. The second measurement provided by the second flow meter 50 (in both the choked and non-choked embodiments) is independent of the measurement provided by the first flow meter 30.

Figure 3:
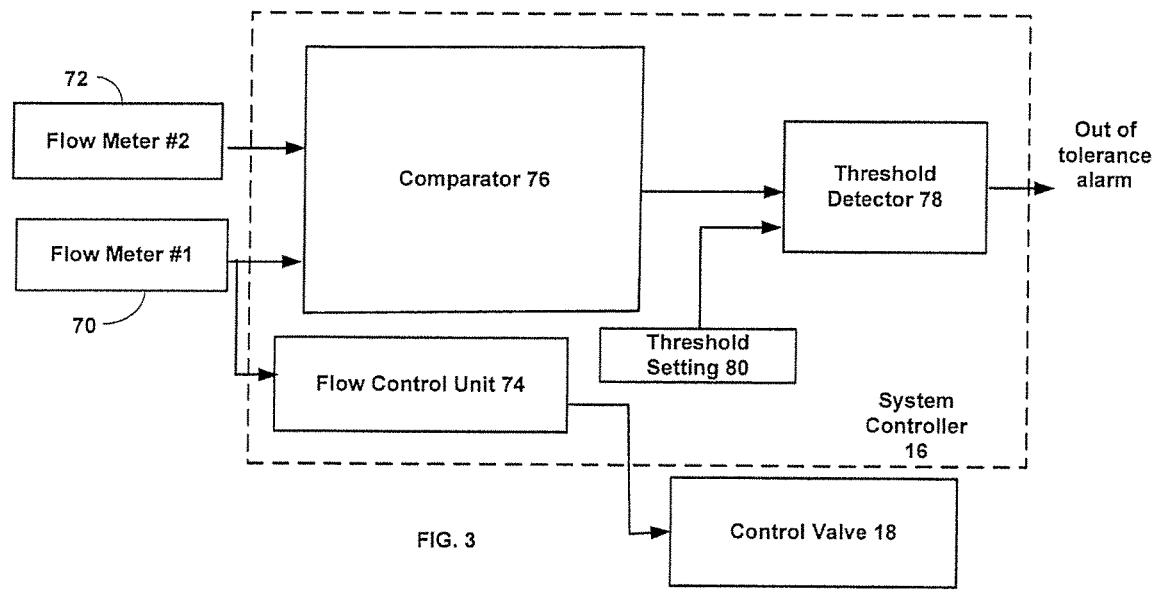
FIG. 3 is a block diagram of components for generating a signal indicating when an MFC, such as the ones described in connection with FIGS. 1 and 2 are out of calibration tolerances.

Referring to FIG. 3, the system controller 16 processes the outputs of the flow meters 70 and 72 so as to provide two flow measurements of the same flow through the MFC. As shown flow meter 70 is provided to a flow control unit 74, which in turn applies a control signal to the proportional control valve 18. A comparator 76 is provided to compare the data representing the sensed flow measurements provided by the two meters 70 and 72 to provide an output signal as a function of and representing any difference between the two measurements. This output signal is compared to some threshold value (provided by threshold setting 80) by a threshold detector 78. Should the output signal of comparator 76 exceed the threshold value (wherein the two meters provide different flow measurements such that the difference between the two exceed a predetermined threshold), the threshold detector provides an alarm or indicating signal to alert the user that at least one of the meters is inaccurate, and that the MFC should be taken off line and further tested. It should be noted that the value of the threshold setting at 80 can be provided in any one of a number of ways including setting the value during the initial factory setup of the MFC, or user programmed. The threshold value can be set as a function of permissible tolerances in mass flow for the particular process with which the controller is used to deliver gas. Thus, some processes may permit greater tolerances in the rate of flow than others.

Figure 4:
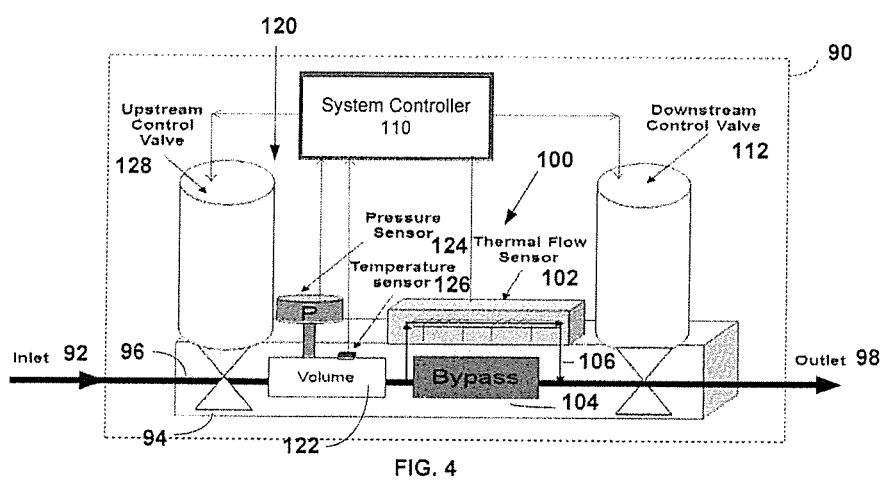
FIG. 4 is a block diagram of another embodiment of a MFC employing the teachings described herein.

While the first and second flow meters have been respectively described as a thermal mass flow meter and a differential pressure flow meter in FIG. 2, they can be other types of flow meters as well, such as coriolis flow meter, magnetic flow meter or ultrasonic flow meter, depending on the application for which the MFC 20 is intended. Another example is shown in FIG. 4, and discussed in more detail below. Although it is preferred that the type of the first flow meter is different from that of the second flow meter, the two flow meters can be same type. For example, both flow meters can be either thermal mass flow meters or differential pressure flow meters. Further, although the first flow meter 30 is located upstream to the control valve 18 and the second flow meter is located downstream to the control valve 18, the locations of these two flow meters can be anywhere along the main flow path 34 of the MFC. For example, both flow meters can be upstream or downstream to the control valve 18.

As shown in FIG. 3, while the measurement from the first flow meter 70 is used in the flow control unit 74 to control the MFC flow output and the measurement from the second flow meter 72 is used to verify the accuracy of the MFC in real time, the measurement from the second flow meter 72 can be used in the flow control unit 74 to control the flow output of the MFC 20 and the measurement from the first flow meter 70 be used for flow verification.

Another more detailed exemplary embodiment of a MFC 90 illustrated in FIG. 4, includes system controller and processor 110 and two flow meters 100 and 120 that are configured and arranged and operate in a manner described herein. The embodiment shown in FIG. 4 utilizes a thermal mass flow meter for measuring the flow, and a downstream control valve for responding to the measurements by the thermal mass flow meter so as to control the flow through the MFC 90. In addition, MFC 90 includes integrated pressure and temperature sensors, a predetermined internal volume and an integrated upstream control valve (together with the downstream control valve) to provide flow verification utilizing a pressure rate of decaying method.

As shown in FIG. 4, gas is received at the input port 92 of block 94. The latter includes a passageway defining main flow path 96 through the MFC to the outlet port 98. The first flow meter 100 is shown as a thermal mass flow meter. As described above, thermal mass flow meters typically include a thermal mass flow sensor, such as shown at 102. The latter usually includes a bypass element 104 disposed in the bypass of the main flow path 96 of the gas flow through the block 94. A U-shaped capillary tube 106 has opposite ends respectively connected to the primary pathway at the upstream and downstream ends of the bypass element 104. One or more resistance elements (not shown) (two being the most common) are used to measure flow through the capillary tube based on temperature measurements. In this example, temperature can be measured as a function of the difference in resistances of the two resistance elements, which in turn is a function of the difference in the sense temperatures of the fluid. The measured temperature difference is in turn a measure of the mass flow rate. The bypass element 104 is designed to ensure that gas flow through the bypass element 104 between the two ends of the capillary tube 106 is laminar. By maintaining laminar flow, the measured flow rate of gas through the capillary tube 106 will be an accurate percentage of the flow through the main flow path 96. Thus, the sensed flow rate through the capillary tube 106 will be an accurate measure of the flow rate though the MFC 90 and exiting outlet port 98. Data representing the sensed flow rate is communicated to the system controller 110. The flow rate is controlled with the downstream control valve 112. More specifically, a signal is provided to the system controller 110 by the flow meter 100 as a function of the measured flow rate sensed by the thermal mass flow sensor 102. The system controller 110 also receives a signal representative of a set point representing the desired flow. The set point is a function of the process being run. The two signals are compared and a feedback signal is provided to downstream control valve 112. The controller is configured and arranged to adjust the control valve as needed to insure the actual flow rate equals the set point as close as possible.

In order to verify that the thermal mass flow meter 100 and control valve 112 are accurately controlling the flow of gas through the mass flow controller 90, the mass flow controller 90 also includes a second flow meter 120 that is configured and arranged to verify the flow rate through the mass flow controller (as measured by the thermal mass flow meter) utilizing a pressure rate of decaying method. The second flow meter 120 includes predetermined volume 122 for receiving gas flowing though the mass flow controller. In the illustrated embodiment the predetermined volume 122 is formed and defined by a cavity in a structure in the form of the block 94. Forming the volume in block 94 eliminates the need for a separate vessel container defining the volume 122 so as to reduce the complexity and cost of the MFC. While all of the components are shown secured to the block 94, not all of the components need be so mounted. For example, only the second flow meter 120 and upstream proportional control valve 128 could be mounted on the block 94, with the other components separately mounted on other structure. The second flow meter also includes pressure sensor 124 and a temperature sensor 126 respectively providing to the system controller 110 signals representing the pressure and temperature of gas within the volume 122. The second flow meter also includes the use of upstream control valve 128, as well as downstream control valve 112, so that the two flow meters share the same downstream valve. The second control valve 128 can be either an isolation valve or a proportional control valve. If the second control valve 128 is a proportional control valve, the pressure sensor 124 and the second control valve 128 along with the system controller or processor 110 can form a closed-loop pressure controller such that (1) the pressure rising inside the MFC's predefined volume 122 is well under control when the flow verification is done, and second control valve 128 is opened to let gas into the MFC, i.e. controlling the second control valve so as to slowly let the inside pressure of the MFC rise to the upstream pressure of the inlet gas in order to avoid in-rush gas; and (2) if there is an upstream inlet pressure disturbance during the flow control period (any nonzero flow set point), this pressure controller will automatically adjust the openness of the second control valve 128 so as to regulate the inside pressure between the two control valves 128 and 112 such that the inlet pressure disturbance effect on the MFC output flow control is minimized. This improves the pressure insensitivity performance of the flow control of MFC 90.

The controller 110 is configured and arranged to operate as follows:
    (a) When the set point is at zero the downstream valve is closed, and the upstream valve is open such that the volume between the control valve 128 and the control valve 112 is allowed to fill with gas from the source that is coupled to the input port 92. When the inside pressure (measured by the pressure sensor 124) is stabilized, the upstream control valve 128 is closed.

(b) When a flow set point is changed from zero to a non-zero value, the upstream control valve 128 is kept close and the downstream flow control valve 112 is opened to regulate the flow Qt based on the measurement of first flow meter 100 to the flow set point provided to the controller 110.

(c) For a predetermined period of time, the mass flow controller verifies the flow rate based on the rate of decay of the pressure signal (as the pressure drops within the volume 122) in accordance with the following relationship:

$$Q_v = -V[d(P/T)]/dt \quad (1)$$

wherein $Q_v$ is the verified flow rate as determined by the second flow meter;

V is the predetermined volume of volume 122;

P is the pressure as measured by pressure sensor 124 and represented by the signal provided by the sensor 124 to the controller 110;

T is the temperature as measured by temperature sensor 126 and represented by the signal provided by the temperature sensor 126 to the controller 110; and $d(P/T)/dt$ is the first derivative of the ratio P/T, i.e. the rate of change of the ratio P/T.

In one embodiment the predetermined period of time for measuring the flow with the flow meter 120 is between about 50 ms and about 1000 ms, although this can vary depending on the specific application to which the mass flow controller is used.

(d) Following the verification measurement, the flow rate verification value Qv is obtained by the controller 110 and stored in memory (not shown). The upstream control valve 128 can then be opened in order to let mass flow controller 90 continue the flow control utilizing the first flow meter 100.

The system controller 110, the pressure sensor 124 and the upstream control valve 128 can form a closed-loop pressure controller to regulate the pressure inside the predefined volume 122. The closed-loop pressure controller is constructed and arranged so that (1) the second control valve can be controlled so as to slowly let the inside pressure of the MFC rise to the upstream pressure of the inlet gas in order to avoid in-rush gas; and (2) if there is an upstream pressure disturbance during the flow control period, the closed-loop pressure controller will automatically adjust the openness of the second control valve so as to regulate the pressure within the predetermined volume such that the inlet pressure disturbance effect on the output flow control of the mass flow controller is minimized, so as to improve the pressure insensitivity performance of the flow control of mass flow controller.

The system controller 110 can be configured in a similar manner to that of the arrangement shown in FIG. 3 so as to use the measurements of flow from the second flow meter to verify the accuracy of the measurements provided by the first flow meter. Thus, in the illustrated embodiment, the mass flow controller 90 is further configured to compare the verified flow rate $Q_v$ of the second flow meter (120) with the flow rate measured by the first flow meter (100) $Q_t$, and a flow error alarm signal is provided if the deviation between $Q_t$ and $Q_v$ exceeds a predetermined threshold.

In one embodiment, the mass flow controller 90 is configured to perform self-calibration based on the measured values of $Q_v$ and $Q_t$. The control valve 112 is controlled allowing gas to flow through the mass flow controller 90 as a function of the flow set point through the mass flow controller so long as the flow set point is non-zero. Following the setting of the flow set point to zero, the mass flow controller is configured to immediately close the downstream flow control valve 112.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

What is claimed is:

1. A mass flow controller comprising:
   a first, thermal mass flow meter operative to measure flow rate of mass of gas through the mass flow controller in real time during the running of a process, and to produce a first flow measurement signal representing a measured flow rate through the mass flow controller;
   a differential pressure flow meter including (i) a flow restrictor disposed in a flow path of the mass flow controller, (ii) a pressure sensor operative to sense pressure in the flow path of the mass flow controller upstream of the flow restrictor, and (iii) a temperature sensor operative to sense temperature of the flow path upstream of the flow restrictor;
   wherein the differential pressure flow meter is operative to measure flow rate of mass of gas through the mass flow controller, and to produce as an output a second flow measurement signal based on data from the pressure sensor and the temperature sensor;

a control valve disposed between the first, thermal mass flow meter and the differential pressure flow meter, with the first, thermal mass flow meter upstream of the control valve and the differential pressure flow meter downstream of the control valve, the control valve operative to control the flow rate of mass of gas through the mass flow controller in response to a control signal generated as a function of the flow rate as measured by one of the flow meters during the running of the process; and a system controller operative to receive the first and second flow measurement signals produced by the first and differential pressure flow meters, respectively, and to generate the control signal, and to provide an alarm signal indicating when a difference between the first and second flow measurement signals exceeds a predetermined threshold.

2. The mass flow controller of claim 1, where the differential pressure flow meter is configured to have a second pressure sensor operative to sense pressure in the flow path downstream of the flow restrictor, and to measure flow rate of mass of gas through the mass flow controller under both choked and unchoked flow conditions during the running of the process.

3. The mass flow controller of claim 1, wherein the control signal is generated as a function of the flow rate as measured by the first flow meter.

4. The mass flow controller of claim 1, wherein the control signal is generated as a function of the flow rate as measured by the differential pressure flow meter.

5. The mass flow controller of claim 1, wherein the threshold is user set.

6. The mass flow controller of claim 1, wherein the threshold is factory set.

7. The mass flow controller of claim 1, wherein the threshold is set as a function of permissible tolerance in mass flow for the process with which the controller is used to deliver gas.

8. The mass flow controller of claim 1, wherein the flow restrictor comprises a critical flow nozzle.

9. The mass flow controller of claim 1, wherein the flow restrictor comprises an orifice.

* * * * *